May 15, 1934.    J. C. HAMILL    1,958,852
SELF LOCKING FASTENING MEANS
Filed June 29, 1933    2 Sheets-Sheet 1
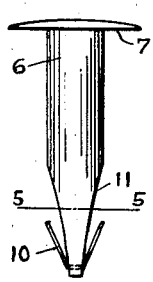
Fig. 1
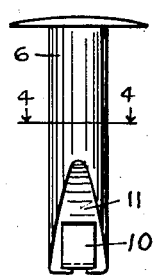
Fig. 2
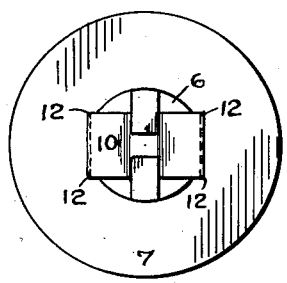
Fig. 3
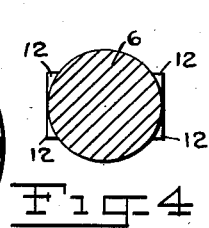
Fig. 4
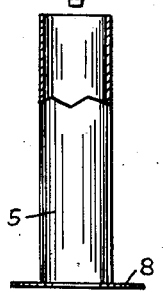
Fig. 5
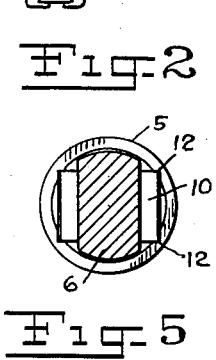
Fig. 6
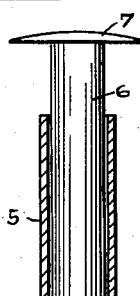
Fig. 7
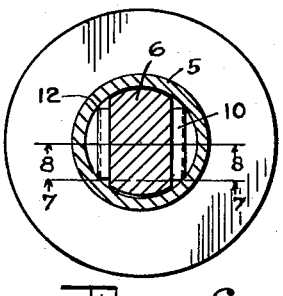
Fig. 8
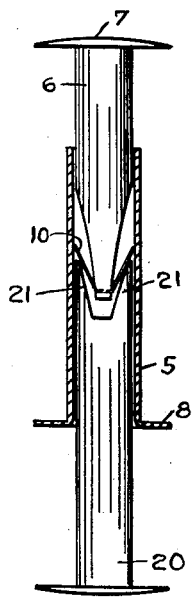
Fig. 10
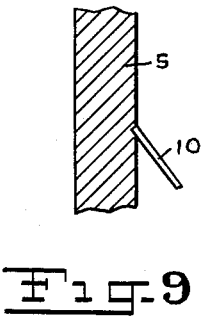
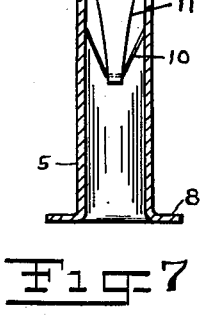
Fig. 9
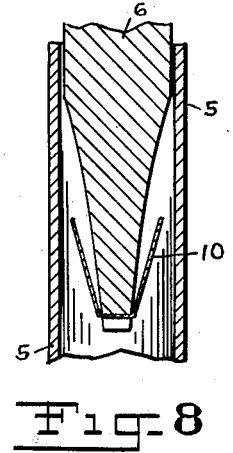
INVENTOR
John C. Hamill
BY
Chas. W. Hull.
ATTORNEY May 15, 1934.       J. C. HAMILL       1,958,852
SELF LOCKING FASTENING MEANS
Filed June 29, 1933       2 Sheets-Sheet 2
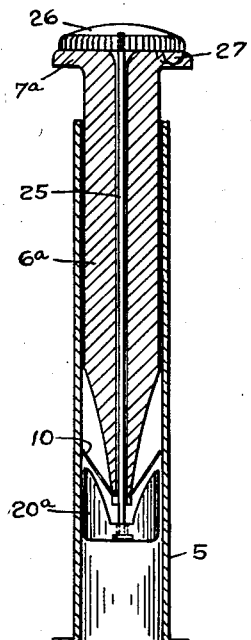
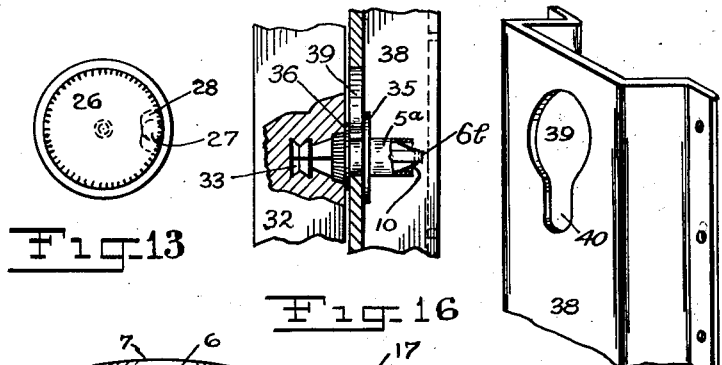
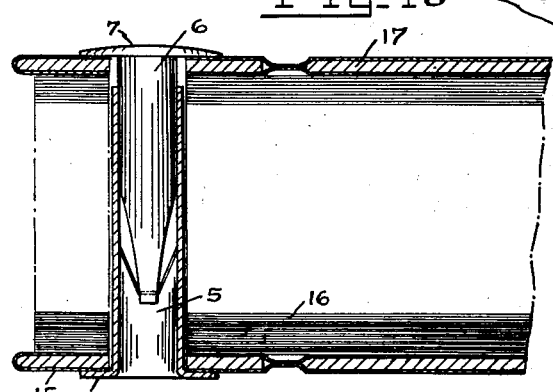
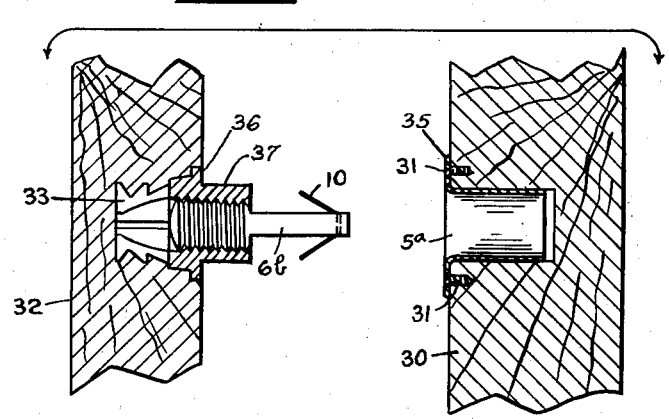
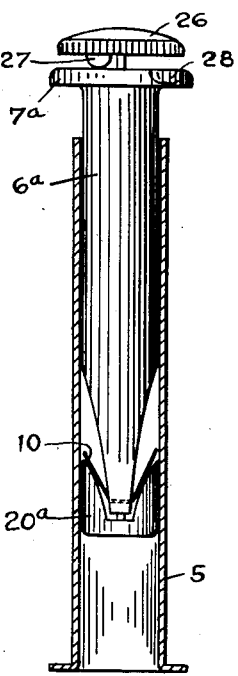
INVENTOR
John C. Hamill
BY Chas. W. Hull
ATTORNEY Patented May 15, 1934

1,958,852

UNITED STATES PATENT OFFICE 1,958,852

SELF LOCKING FASTENING MEANS

John C. Hamill, Laurelton, Long Island, N. Y.

Application June 29, 1933, Serial No. 678,159

17 Claims. (Cl. 85—4)

The present improvements relate, in general, to securing means for uniting elements in fixed relation with respect to one another and more particularly to sectional members adapted to be telescoped for providing a temporary or permanent union.

A primary object of the improvements is to provide a novel combination of members, adapted to be disposed within one another, and coupled to each other inseparably except by the use of a key or release means.

A further object is to provide an improved design of a sectional post which prevents uncoupling either by twisting, pulling or jerking.

Another object is to provide a novel form of coupling means, and also a novel form of uncoupling or releasing means.

A still further object is to provide a structure of the character described wherein the engaged or coupled members are of varying degrees of hardness, so that one may embed itself into the other.

Another object of the improvements is to provide a novel form of pin with coupling means for use with various types of receiving members.

The provision of a novel telescopic assembly having a releasable means associated therewith, constitutes a further object of the invention.

More specifically, another object of the invention is to provide a reliable and foolproof attachment means for wall board, signs, etc. wherein an invisible mounting is provided.

Another object of the invention is to produce a binding post for loose-leaf binders which is of simple and inexpensive construction and which may be quickly and conveniently assembled or released.

Another object of the invention is to produce a sectional binding-post which is adapted to be used to secure together a widely varying number of sheets without any change in form or other readjustment.

Other objects and advantages of the present improvements will be apparent to those skilled in the art upon reference to the accompanying specification and drawings in which—

Fig. 1 is a side elevation, partly in section, of one form of the present improvements;

Fig. 2 is a side elevation of the pin or male member, viewed from another angle;

Fig. 3 is a bottom plan view of the pin or male member;

Fig. 4 is a section on line 4—4 of Fig. 2;

Fig. 5 is a section on line 5—5 of Fig. 1;

Fig. 6 is a sectional view of the male and female members in telescoped and coupled relation;

Fig. 7 is a section on line 7—7 of Fig. 6;

Fig. 8 is an enlarged fragmentary section on line 8—8 of Fig. 6;

Fig. 9 is a magnified and exaggerated fragmentary view showing the manner of coupling the elements together;

Fig. 10 is a view similar to Fig. 7, illustrating a form of release or uncoupling means;

Fig. 11 is a section of a modification;

Fig. 12 is a view of the form in Fig. 11, illustrated in released position;

Fig. 13 is a plan view of the device in Fig. 11;

Fig. 14 is a section of a loose-leaf binder, illustrating one application of the improvements;

Fig. 15 is a section of a wall board and furring strip illustrating another application of the invention;

Fig. 16 is a sectional view, illustrating the manner of attaching a wall board to a metallic strip by means of the present improvements;

Fig. 17 is a perspective view of a fragment of a conventional metallic building strip.

Referring to the drawings, the present improvements have been illustrated in several embodiments, as representative of the scope and application thereof to various lines of endeavor. The members adapted to be telescoped comprise the female or receiving tubular member 5 and the male or pin member 6. As illustrated, these members are preferably rounded cylindrical members, but they may take other shapes such as square, rectangular or hexagonal tubular members. These and other shapes are contemplated and within the scope of the present improvements. Each member of the telescopic assembly is provided with a retaining or mounting means 7, 8 for contact with objects with which the device is to be used.

The coupling of these members is preferably effected by employing a coupling member 10 consisting of a material having a greater degree of hardness, than the interior of the sleeve member 5 and having a sharp tooth or other effective scoring member for automatically biting into the wall of the sleeve member.

In the illustrated embodiments, the coupling member 10 is in the form of a metallic ribbon preferably made of tempered steel and therefore harder than the member 5 which may be made of copper, brass or the like. The lower portion of pin 6 is beveled or tapered at 11 for accommodating and facilitating the mounting and movement of the coupling member 10. The latter is preferably formed into the shape of a V with a broadened or rounded base and is anchored at the crotch to the end of the tapered pin. This may be accomplished in any desired manner as, for example, by recessing the end of the pin and then crimping the edges over the member 10.

As illustrated the coupling member 10 has wings or free ends inclined along the body of the pin 6, so that they diverge from the pin in a direction opposite to the direction of advance of the pin into the member 5. These free ends of the coupling member 10 have sharp corners which protrude at spaced points about the pin 6, thereby providing teeth or spurs 12. Upon reference to Figs. 3 and 4, four such spurs 12 will be seen projecting beyond the periphery of the male member 6.

The arrangement of these teeth or spurs is such that, when the members 5 and 6 are aligned as in Fig. 1, diagonally opposite teeth are spaced apart a distance slightly exceeding the diameter of the female member 5. This relation is clearly observed in Fig. 5. Where the number of teeth is increased or decreased, a corresponding relation is preserved, so that the teeth protrude beyond the inner face of the sleeve member when unassembled, as in Fig. 5.

The coupling member 10 is illustrated in Figs. 1 to 5, in a normal rest position. Any tendency to compress or fold the free ends or wings toward the pin 6 will be resisted by the spring or resilient properties of the metallic ribbon. Accordingly, the free ends of the coupling member 10 may move laterally a limited amount, i. e., toward and away from the pin with the apex as a pivot. When the free ends are moved toward one another from the illustrated position of rest, they become tensioned so that they tend to expand and strive to return to their original position.

While the coupling member is formed of metallic ribbon having spring energy, nevertheless the member is very rigid along its own axes. For example, referring to Fig. 1, if pressure is imposed on the free end of the member 10, and in a direction along its longitudinal axis, the member will not flex or buckle, but will withstand the force. Therefore, a pull applied at the crotch of the coupling member, against resistance imposed at the free ends, will not bend or flex the parts of the member. The effect is therefore in the nature of a strut or brace. Likewise, the member is rigid along its transverse axis, so that no flexing or bending occurs crosswise of the ribbon. Accordingly, pressure imposed on opposite sides or corners of the same free end or wing of the coupling member would not cause bending across the member.

In assembling the unit for use, the members 5 and 6 are moved from the position of Figs. 1 and 5, to that illustrated in Figs. 6 and 7. While the pin 6 readily fits within the tubular member 5, the oversize coupling member 10 must be contracted in order to enter. This is automatically accomplished as the wedge shaped member 10 engages the tubular member 5. As the pin is advanced in telescoped relation the wings of the coupling member are compressed or folded toward each other, and are tensioned against the wall of the sleeve member. The latter is engaged by the teeth or spurs 12 which are being forced against the wall. Compare Figs. 5 and 6. While the pin is being advanced, the teeth or spurs effect a slight scoring on the softer interior of the tubular member. However, when the advance movement is stopped, the parts become automatically locked and prevent withdrawal or separation, except by use of a special tool or implement. The two elements may thus be pushed together to any desired point of adjustment.

As observed, the sharp teeth or spurs 12 are tensioned against the wall of the tubular member 5, since the coupling member is exerting an expanding force like pawls. These sharply pointed members bite or dig into the wall of the member 5, in a manner similar to the exaggerated showing in Fig. 9. If an attempt is now made to pull the members 5 and 6 apart, the teeth are forced further into the member 5 and take a firmer grip on it. This circumstance, coupled with the rigidity of the coupling member, prevents any movement in a separating direction. A combined twisting and pulling force cannot dislodge or move the members apart. However, they may be pushed further together readily, the spurs automatically releasing their hold on the tubular member and taking up a new grip further along.

Accordingly, the parts may be inseparably locked together at an infinite number of positions, which are limited only by the length of the parts. When in assembled position, there is no possibility of back-lash or play between the parts since every portion of the interior of member 5 is available for engagement by the coupling member.

One application of the improvements is illustrated in Fig. 14, wherein the device is employed in connection with a loose leaf binder. The member 5 is disposed through the binder cover 15 and the loose leaves 16 may be threaded on to the post in any number desired. Pin 6 is inserted through cover 17, and then the pin is inserted in sleeve member 5, and advanced until the cover meets the leaves. When these parts are pushed together as closely as possible, the coupling member 10, holds the entire assembly firmly against separation. The securing means 7, 8, engage the covers, and hold the unit in operative position. It will be seen that this provides a permanent binder, in which there is no play or looseness, and one which cannot be opened except by a tool or implement. Furthermore, the device insures a tight and inseparable binder irrespective of the number of sheets used. The binder may therefore be adjusted to any fraction of an inch, with the same efficient result.

Upon reference to Fig. 10, a release means in the form of a key 20 is illustrated. This implement is provided with a bifurcated end having rigid prongs 21 which, upon insertion in member 5, are adapted to contact the coupling member 10 and disengage it from the member 5. In this manner the key 20 may be used to eject the pin 6. It is noteworthy that the pitch of the prongs 21 is greater than that of the V-shaped coupling member, so that the spaced tips of the key may engage the member 10 near its free ends and contract them. Engagement near the crotch of the member 10 is thereby avoided.

The binder in Fig. 14 may thus be released for the addition or removal of sheets. If desired, the open end of member 5 (Fig. 14) may be plugged, as by solder or the like, thereby preventing the use of a key, and rendering the binder permanently inseparable. Furthermore, a longer sleeve 5 may be used, and a pin 6 inserted in each end, thereby preventing removal of either pin. The head 8 of the sleeve may be embedded in the cover so as to prevent access to its open end.

Upon reference to Figs. 11 to 13, a combination of sectional post and release means in one unit, is illustrated. Therein, the pin 6a is bored to accommodate a rod 25 having a cap 26 at one end and a key 20a loosely mounted at the inner end. The sectional post may be uncoupled in two ways, either by pulling on cap 26 or by rotating it, whereupon key 20a is brought into engagement with the member 10 for releasing it. Normally, a cam 27 on cap 26 rests in recess 28 of head 7a. Upon rotation of the cap, the cam rides up onto the head 7a, thereby elevating the key the required amount.

Where it is desired to provide an invisible yet dependable mounting for flat objects such as wall board, rugs, sign plates, cowls, access plates, etc., on airplanes and automobiles or the like, and in numerous other relations, the embodiment illustrated in Fig. 15 may be employed. A furring strip 30 may be recessed for receiving the sleeve member 5a, which may be secured in any desired manner, as by screws 31. The panel or wall board 32 may be recessed to accommodate an anchor member 33, into which the pin 6b is secured. Any suitable means, such as screw threads, may be employed for mounting the pin. The coupling member 10 is of the same form as in the other embodiments. The board 32 may now be fixed permanently in position by inserting the pin 6b into the sleeve 5a, whereupon the board is inseparably locked to the furring strip 30. An invisible and permanent mounting is thereby provided.

The embodiment illustrated in Fig. 15 may also be employed in conjunction with mounting wall board or the like on metallic lath or strips. This adaptation of the improvements is illustrated in Figs. 16 and 17. The members 6b and 33 are imbedded in the wall board 32 and a loose sleeve member such as 5a is telescoped over the member 6b until the flange 35 is suitably spaced from the member 33. The coupling member 10 secures the parts in spaced relation so that the flanges 35, 36 form a spool-shape member with shank 37. The wall board 32 with this device protruding therefrom is brought up to the metallic strip 38, inserted into the larger portion of aperture 39 in the strip and then permitted to descend into the smaller portion 40 which provides a nice fit with shank 37. The flange 35 engages behind the metal lath and holds the wall board in position. It is apparent therefore that the device illustrated in Figs. 15 and 16 is adapted for use either with wooden or metallic furring strips. They may accordingly be used with permanent or removable partitions.

Obviously, the pin 6b may be made with a coupling member 10 at each end, and a sleeve member 5a at each end. The two sleeves may be mounted on the object and on the foundation respectively, and the pin 6b will grip both and hold all parts firmly together.

It will be seen that the number of teeth or spurs 12 may be varied, so long as they protrude beyond the tubular wall before insertion, and engage and bite into same under tension after insertion. Two or more such points are preferable for the most efficient results. Obviously, the teeth may be the sharp corners of the same flat steel ribbon or they may be points on separate resilient members, suitably positioned.

If desired, the sleeve member may be made of bakelite, wood or other penetrable substance. Furthermore, in mounting an object on a wooden base or foundation, the sleeve member may be dispensed with. In such cases, a hole or pocket may be provided in the wood and the coupling member compressed into it, whereupon the teeth or spurs bite directly into the wood, and effect the fastening of the object.

Various modifications of the improvements may be made without departing from the invention. The coupling member 10 may be made of several strips of ribbon and may have the spurs and/or the mounting for the ribbon at different elevations. If desired, a strip of ribbon with teeth may be employed on only one side of the pin. Likewise, various ways of yieldingly mounting these members may be employed. For example, they may be pivoted to the pin, and urged outwardly by a separate spring member. So long as the pointed elements are provided, the members which carry them may be of various shapes, and of various mountings, and the sleeve and pin may have various shapes.

The various applications of the present improvements may be apparent. The sectional parts may be employed in various types of binders, such as transfer books, swatch books, permanent records or the like. As aforementioned, their use as visible or invisible fasteners is of wide application.

I claim:

1. An adjustable securing means comprising rigid male and female members disposed in telescoped relation, a yieldable coupling member mounted on said male member and tensioned against the inner face of said female member in various positions of adjustment, and capable of being released by appropriate means, said female member having an interior softer than the material of the coupling member whereby the latter bites into said female member for preventing uncoupling thereof.

2. An adjustable securing means comprising rigid male and female members disposed in telescoped relation, a yieldable coupling member mounted on said male member and bearing against the inner face of said female member in various positions of adjustment, and capable of being released by appropriate means, said coupling member being made of a material harder than the material of which the female member is made, whereby said coupling member may grip said female member for preventing uncoupling of the members.

3. A device of the character described comprising adjustable cylindrical members disposed in telescoped relation, means preventing uncoupling of said members comprising a ribbon-like member inclined with respect to the axes of said members, said ribbon-like member having a portion anchored to one of said cylindrical members and a free end extending toward the other cylindrical member and away from the direction of advance of said first-named cylindrical member, said free end having teeth releasably engaging the inner surface of said cylindrical member.

4. A device of the character described comprising cylindrical members disposed in telescoped relation, coupling means for said members comprising a ribbon-like member inclined with respect to the axes of said members, said ribbon-like member having a portion anchored to the inner cylindrical member and a free end squared for providing sharp corners engaging into the inner face of the other cylindrical member at spaced points, said free end extending away from the direction of advance of said inner cylindrical member.

5. A device of the character described comprising rounded cylindrical members disposed in telescoped relation, means for affording relative movement of said members in one direction and preventing movement in an opposite direction comprising a member mounted on the innermost cylindrical member and having diverging spring ends, said ends having teeth defining a rectangle within and engaging said outermost cylindrical member at spaced points about its inner face, said spring ends extending away from the direction of advance of said innermost cylindrical member.

6. In a securing means including telescoped elements, an innermost member comprising a pin, a plurality of pointed, longitudinally rigid, elements projecting at intervals about and beyond the peripheral face of said pin, said pointed elements being mounted on said pin so as to project outwardly along said pin and away from the direction of advance thereof, and being yieldable laterally of said pin.

7. In a securing means of the character described, a male member, a longitudinally rigid member yieldably attached to said male member and having a free end extending along said male member away from the direction of its advance, and a plurality of sharp points on said rigid member protruding beyond the face of the male member.

8. In a securing means including telescoped elements, an innermost member comprising a pin, a ribbon-like member anchored in said pin and having free end portions extending outwardly along different sides of said pin away from the direction of its advance, the side edges and end edges of said ribbon-like member being formed so as to provide at least two sharp teeth protruding on different sides of the pin.

9. A binder post assembly comprising cylindrical members disposed in telescoped relation, means preventing uncoupling of said members comprising a member anchored to the innermost member and having a free end extending away therefrom toward said outermost member and away from the direction of advance of said innermost member, said free end having spaced teeth engaging the outermost member.

10. A binder post assembly comprising cylindrical members disposed in telescoped relation, means preventing uncoupling of said members comprising a member anchored to the innermost member and having a free end extending away therefrom toward said outermost member and away from the direction of advance of said innermost member, said free end comprising a straight edge terminating in sharp points engaging the outermost member.

11. A releasable securing means comprising male and female members mounted in telescoped relation, a releasable coupling means mounted on one of said members and engaging the face of the other member for preventing uncoupling thereof, said coupling means being disposed between the ends of the female member when the members are in telescoped relation, release means mounted on said male member for releasing said coupling means, and means carried by said male member operable from the exterior of said members for actuating said releasing means for uncoupling said members.

12. A releasable securing means comprising male and female members mounted in telescoped relation, a yieldable coupling member mounted on said male member and engaging the inner surface of said female member for preventing uncoupling of said members, a key mounted on said male member and movable relative thereto and engageable with said coupling member for disengaging it from said female member, and means carried by said male member for manipulating said key from the exterior of said members for effecting their disengagement.

13. A binding post, comprising a tubular member, a pin adapted to enter the same, a flat V-shaped spring on that end of said pin which is to be inserted into said tubular member, the ends of said spring each having spaced points projecting toward the receiving end of said tubular member when said pin is inserted thereinto, said spring having a tendency to expand the points against the inner face of the said tubular member, permitting insertion of said pin thereinto but preventing withdrawal therefrom.

14. A binding post, comprising a tubular member, a pin being adapted to enter the same, a flat V-shaped spring on that end of said pin which is to be inserted into said tubular member, the ends of said spring each having spaced points projecting toward the receiving end of said tubular member when said pin is inserted thereinto, said spring having a tendency to expand against the inner face of the said tubular member, diametrically opposed points being spaced in excess of the diameter of said tubular member whereby the spring ends are compressed when said pin is being inserted into said tubular member but spread by movement of said pin in the opposite direction, thereby locking said pin and tubular member together.

15. A binding post, comprising a tubular member, a pin adapted to be advanced into the same, a spring on that end of said pin which is to be inserted into said tubular member having a rigid point projecting away from the direction of advance, said spring having a tendency to expand against the inner face of said tubular member, said spring being tensioned when said pin is inserted into said tubular member and expanded by attempted movement of said pin in the opposite direction, thereby locking said pin and tubular member together by engagement of said rigid point with the interior of said tubular member.

16. In a securing means including telescoped cylindrical elements, an innermost member comprising a pin, at least two pointed, longitudinally rigid, elements projecting diametrically about and beyond the cylindrical surface of said pin, said pointed elements being mounted on said pin so as to project along the body of the pin away from the direction of its advance and outwardly therefrom, and being yieldable laterally of said pin.

17. In a securing means of the character described, a male member, coupling means yieldably attached to said male member and extending along the male member away from the direction of its advance, said coupling means being yieldable laterally of said male member and having a pair of spaced points protruding beyond the face of the male member on one side of a plane through its longitudinal axis, said points adapted to engage the inner wall of a female member when assembled in operative position therewith.

JOHN C. HAMILL.